(12) United States Patent
Spencer et al.

(10) Patent No.: US 7,604,282 B2
(45) Date of Patent: Oct. 20, 2009

(54) ADAPTER RAIL FOR SOFT ROLLUP TONNEAU COVERS

(75) Inventors: Michael R. Spencer, Hubbard, NE (US); Kelly Kneifl, Yankton, SD (US)

(73) Assignee: Truxedo, Inc., Yankton, SD (US)

( * ) Notice: Subject to any disclaimer, the term of this patent is extended or adjusted under 35 U.S.C. 154(b) by 0 days.

(21) Appl. No.: 12/020,211

(22) Filed: Jan. 25, 2008

(65) Prior Publication Data
US 2008/0179911 A1   Jul. 31, 2008

Related U.S. Application Data

(60) Provisional application No. 60/886,808, filed on Jan. 26, 2007.

(51) Int. Cl.
*B60J 7/00* (2006.01)

(52) U.S. Cl. .................. 296/100.18; 296/100.15; 296/100.16; 296/3

(58) Field of Classification Search ............ 196/100.18, 196/100.15, 100.16, 3
See application file for complete search history.

(56) References Cited

U.S. PATENT DOCUMENTS 5,494,327 A * 2/1996 Derecktor ............... 296/3
6,547,311 B1 * 4/2003 Derecktor ............ 296/100.12

* cited by examiner

*Primary Examiner*—Joseph D Pape
(74) *Attorney, Agent, or Firm*—Dicke, Billig & Czaja, PLLC

(57) ABSTRACT

An adapter rail for attaching a rack to a side wall on a pickup bed. The adapter rail includes a top rail, a side rail extending from the top rail, and a mounting track attached to the top rail. The mounting track is adapted to engage an adapter on the rack.

21 Claims, 9 Drawing Sheets

ADAPTER RAIL FOR SOFT ROLLUP TONNEAU COVERS

REFERENCE TO RELATED APPLICATION

This application claims priority to U.S. Provisional Application No. 60/886,808, filed Jan. 26, 2007, the disclosure of which is hereby incorporated by reference.

FIELD OF THE INVENTION

This invention concerns systems and methods for attaching an overhead rack system to a pickup truck bed that has a separately installed inside mount tonneau system.

BACKGROUND OF THE INVENTION

Tonneau covers have been successfully commercialized by the Shur Company of Yankton, S. Dak. and are described in various patent documents, including U.S. Pat. No. 6,568,740; U.S. Pat. No. 6,575,520; and U.S. Patent Publication No. 2004/0212212. Overhead rack mounting systems for trucks and other vehicles likely to have inside mount tonneau cover systems are also known. However, the two systems are separately designed and marketed, and therefore generally not compatible with each other, although custom combinations have been developed on a case-by-case basis.

SUMMARY OF THE INVENTION

Various specific embodiments of multiple aspects of the invention are illustrated and described in the documents appended to this application, although the scope of the invention is not limited to only those embodiments so depicted.

DETAILED DESCRIPTION OF THE PREFERRED EMBODIMENTS

Figure 1:
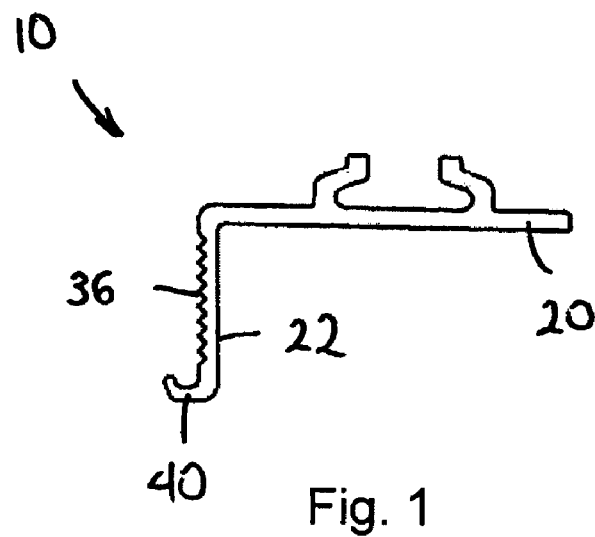
FIG. 1 is a side view of a rail adapter according to an embodiment of the invention.

The figures illustrate a preferred embodiment of the invention. In more general terms, the invention is an adapter rail for mounting an overhead rack system in combination with a standard inside mount tonneau system.

There are several manufacturers of inside mount tonneau systems, including Access Cover, Extang, and SHURCO. These systems are mounted to the pickup bed by clamping the side frame member to the inside vertical flange of the pickup bed.

There are overhead rack systems that mount to the pickup bed by various means of attachment. Some of the manufacturers mount a slide rail to the stake pocket of the pickup bed (Ref: TracRac). Some manufacturers mount the slide rail to the top of the pickup bed by installing fasteners through drilled holes in the top horizontal surface of the pickup bed (Ref: TracRac).

There are several manufacturers that mount fixed rack systems (do not slide) by mounting to either the stake pockets or fastening the rigid rack system to the top horizontal surface of the pickup bed. Recently, OEMs have incorporated track systems on the inside side walls of the pickup bed. This track system is compatible with sliding overhead rack systems (Ref: www.chevy.com) but are not compatible with soft tonneau systems. The latest trend is to include a slide channel in the tonneau side frame member (one extruded rail) (Ref: Pro Rac). This concept is a dedicated tonneau/rack system.

The invention comprises an adapter rail for a sliding overhead rack system. This rail is constructed in a manner that allows products produced by manufacturers of inside mount tonneau systems to be used in conjunction with this adapter rail system. The concept is nearly universal in combining inside mount tonneau products, produced in the market place, with an overhead sliding rack that includes this adapter means. The invention thus enables the two systems to be combined without custom engineering to avoid interference between the mounting hardware or apparatus of each system.

This configuration permits the manufacture of sliding overhead rack systems that uses the invention to produce and market the rack system in combination with a variety of tonneau designs. Most, if not all, inside mount tonneau products in inventory within the current commercial distribution system could be utilized in conjunction with this adapter mounting concept.

In one configuration, the adapter rail 10 includes a top rail 20 and a side rail 22, as illustrated in FIGS. 1-4. The top rail 20 and the side rail 22 may be oriented generally transverse to each other and may be integrally formed with each other.

The adapter rail 10 may be fabricated from a variety of materials using a variety of techniques. One preferred material for fabricating the adapter rail 10 is aluminum that has been extruded. Depending on the application, the adapter rail 10 may be fabricated with a length that extends substantially from a front of a pickup bed to a back of the pickup bed. It is also possible to fabricate the adapter rail 10 to have a shorter length such that more than one adapter rail section may be attached along each side of the pickup bed.

A mounting track 30 is attached to at least a portion of an upper surface of the top rail 20. In a preferred configuration, the mounting track 30 is integrally fabricated with the top rail 20 and extends substantially along the length of the top rail 20.

The mounting track 30 may have a variety of shapes depending on the shape of the adapter (not shown) that will be attached to the mounting track 30. In one configuration, the mounting track 30 has a T-shaped recess formed therein. Providing the recess with this shape enables the adapter to slide laterally in the mounting track 30, but restricts the adapter from moving vertically with respect to the mounting track 30 to thereby retain the adapter in the mounting track 30.

A width of the top rail 20 may be selected based upon the width of the mounting track 30 so that a portion of the top rail 20 extends from both sides of the mounting track 30. In one configuration, the top rail 20 has a width of between about 1 and 3 inches.

The side rail 22 may be fabricated with a width that is similar to a length of a portion 34 of a tonneau cover rail 32 that will be mounted adjacent to the side rail 22. In one configuration, the side rail 22 has a width of between about 1 and 2 inches.

A surface of the side rail 22 opposite the top rail 20 may have a texture that enhances the ability to retain the tonneau cover rail 32 in a stationary position with respect to the side rail 22. In one configuration, the side rail 22 has a plurality of grooves 36 formed therein.

An end of the side rail 22 opposite the top rail 20 includes an extension 40 extending therefrom. The extension 40 may have a J-shape. The extension 40 supports an end of the tonneau cover rail 32 when positioning the tonneau cover rail 32 with respect to the adapter rail 10 and a side 42 of the pickup bed prior to attaching the components together with a clamp 44.

Figure 2:
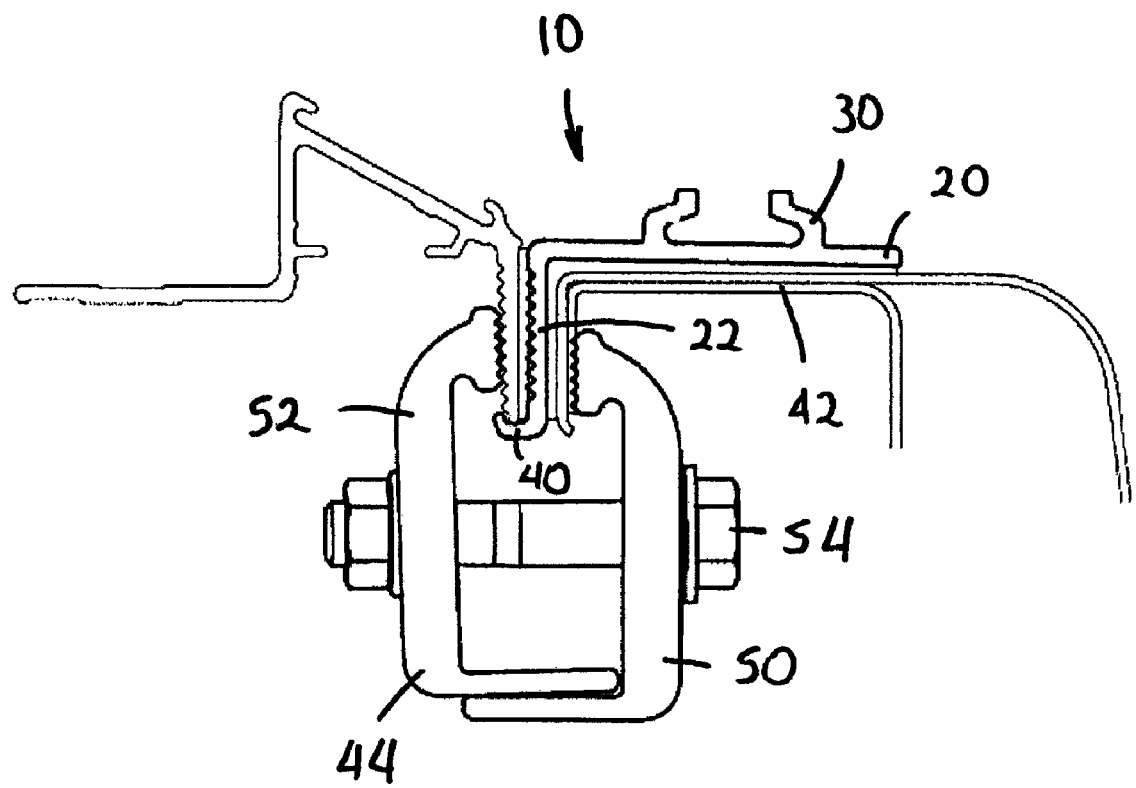
FIG. 2 is a side view of the rail adapter of FIG. 1 attached to a pickup bed with a tonneau cover side rail.
Figure 3:
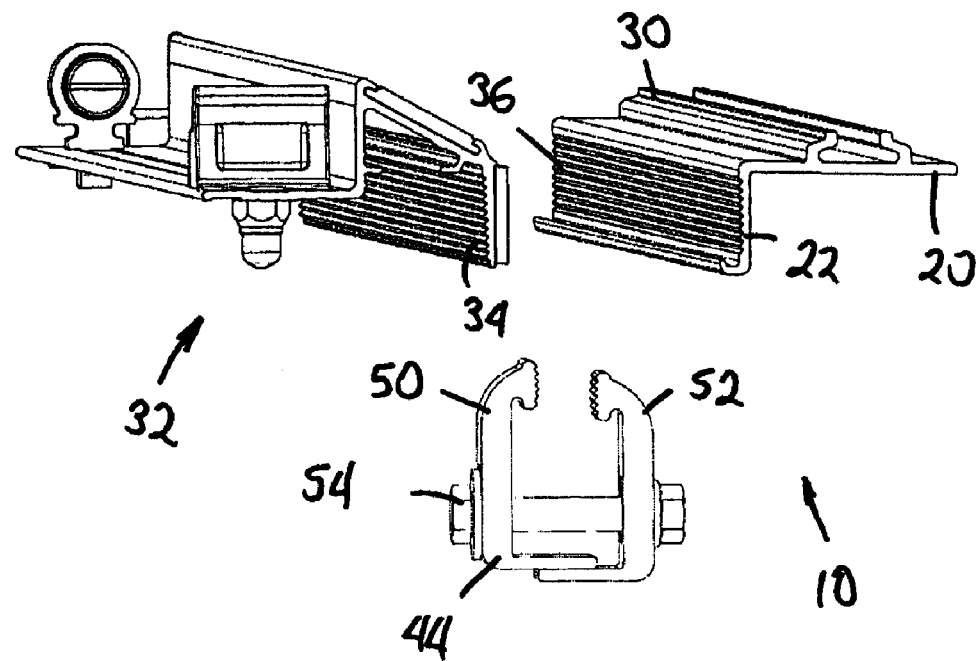
FIG. 3 is a perspective view of the rail adapter of FIG. 1 in an unassembled configuration.
Figure 4:
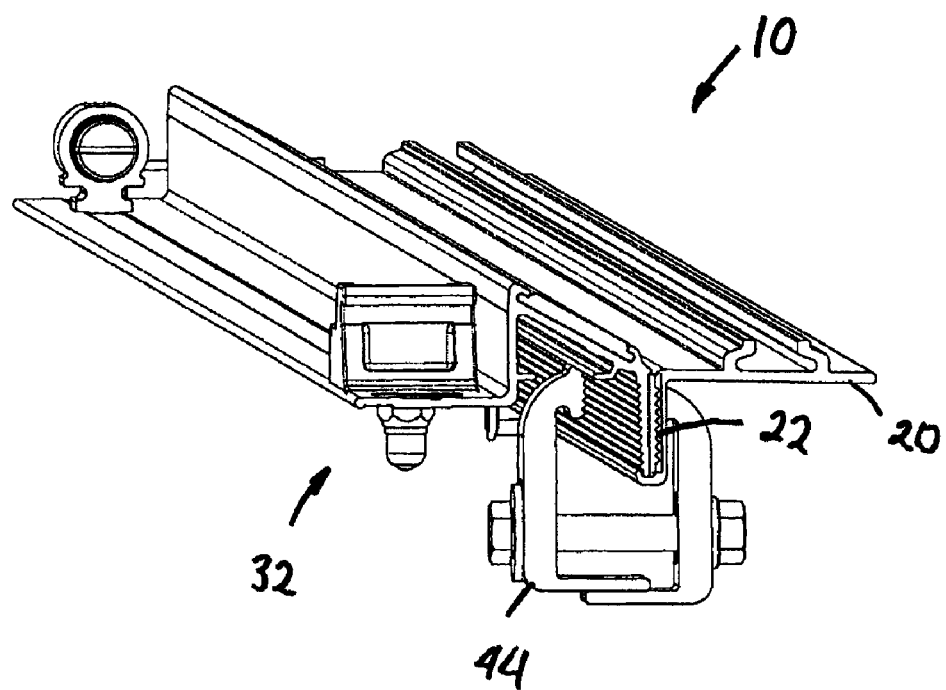
FIG. 4 is a perspective view of the rail adapter of FIG. 1 in an assembled configuration.

The clamp 44 may have a variety of configurations and may be manually operable or operable with tools. In one configuration, the clamp 44 includes a first clamp portion 50, a second clamp portion 52 and a bolt 54 that retains the first clamp portion 50 and the second clamp portion 52 in a desired position with respect to each other, as illustrated in FIG. 2.

Figure 5:
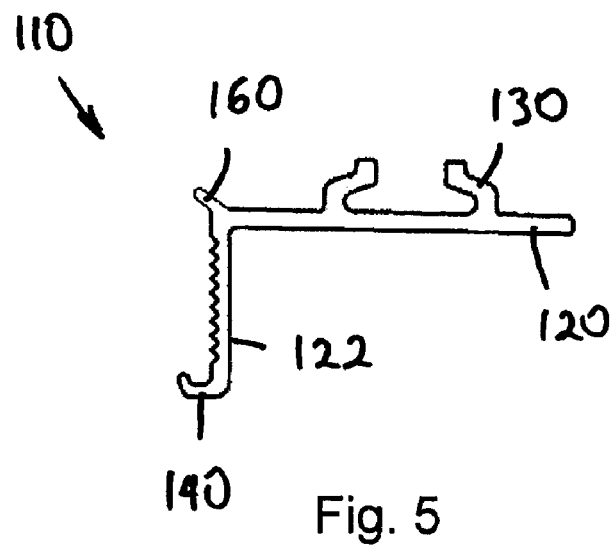
FIG. 5 is a side view of a rail adapter according to another embodiment of the invention.
Figure 6:
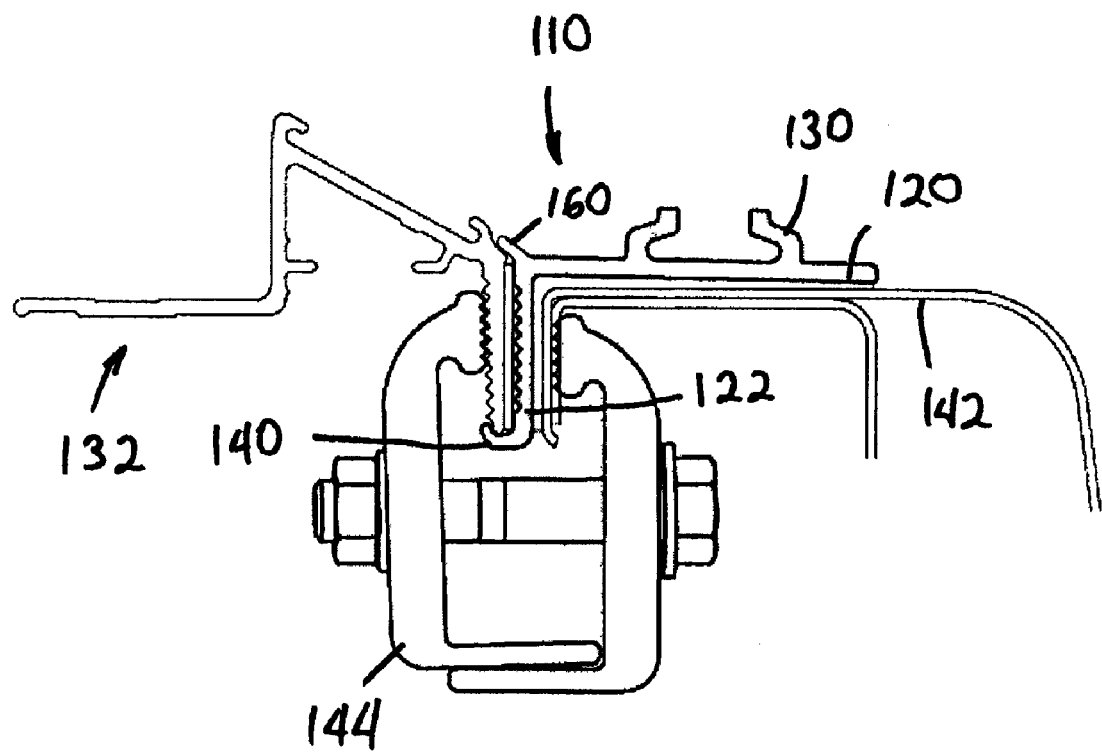
FIG. 6 is a side view of the rail adapter of FIG. 5 attached to a pickup bed with a tonneau cover side rail.

In another configuration, which is illustrated in FIGS. 5-6, an adapter rail 110 generally has a similar configuration to the adapter rail 10 illustrated in FIGS. 1-4. In particular, the adapter rail 110 includes a top rail 120, a side rail 122, a mounting track 130 and an extension 140.

The adapter rail 110 also includes an interlocking lip 160 that extends from the adapter rail 110 proximate the intersection of the top rail 120 and the side rail 122. The interlocking lip 160 may be oriented at an angle of about 135 degrees with respect to the top rail 120.

As illustrated in FIG. 6, the interlocking lip 160 extends over a portion of the tonneau cover rail 132 and thereby reduces the potential of water or other objects falling between the adapter rail 110 and the tonneau cover rail 132 when the tonneau cover rail 132 and the adapter rail 110 are attached to the pickup bed 142 with the clamp 144.

Figure 7:
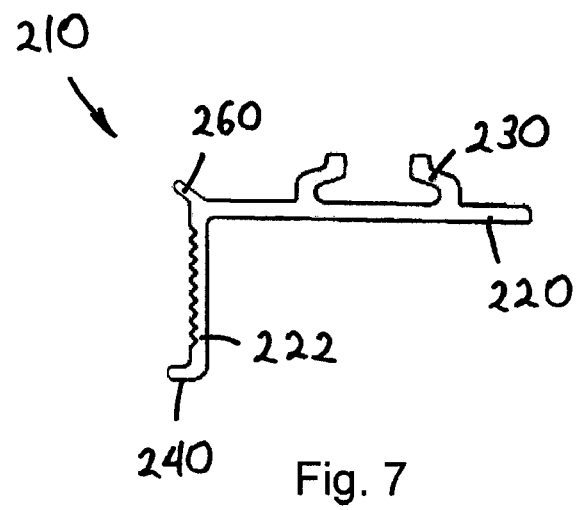
FIG. 7 is a side view of a rail adapter according to another embodiment of the invention.
Figure 8:
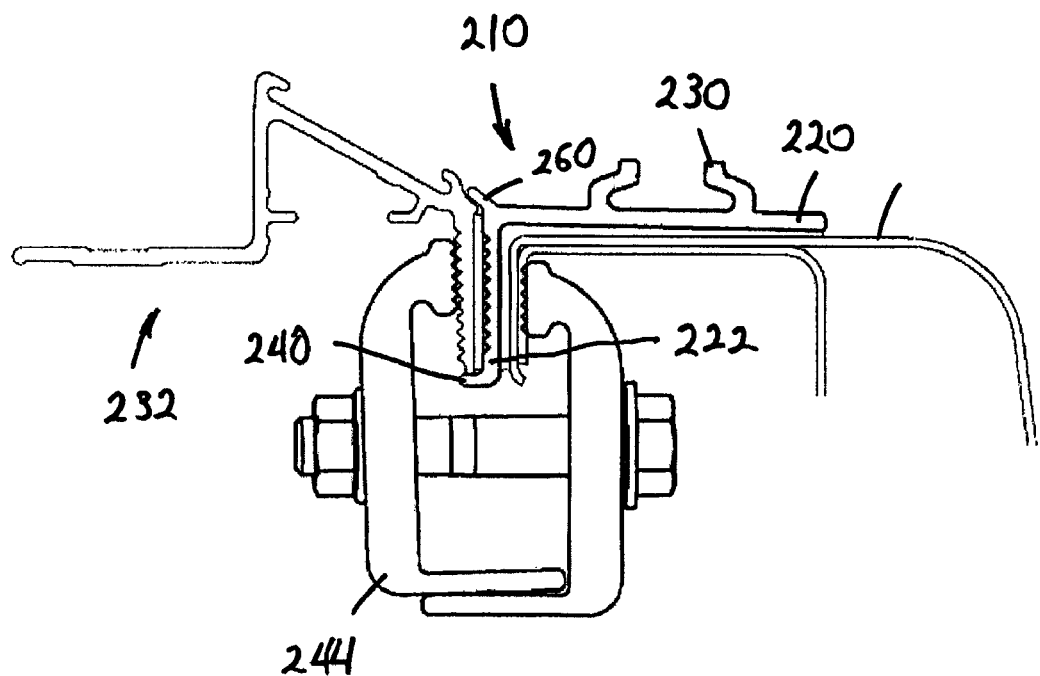
FIG. 8 is a side view of the rail adapter of FIG. 7 attached to a pickup bed with a tonneau cover side rail.

In another configuration, which is illustrated in FIGS. 7-8, an adapter rail 210 generally has a similar configuration to the adapter rail 110 illustrated in FIGS. 5-6. In particular, the adapter rail 210 includes a top rail 220, a side rail 222, a mounting track 230, an extension 240 and an interlocking lip 260.

In contrast from the adapter rail 110 illustrated in FIGS. 5-6, the extension 240 is generally straight as opposed to being generally J-shaped. While the extension 240 provides support to the tonneau cover rail 232 when being attached to the pickup bed 242 with the clamp 244, the extension 240 is suited for use with tonneau cover rails 232 having various thicknesses.

Figure 9:
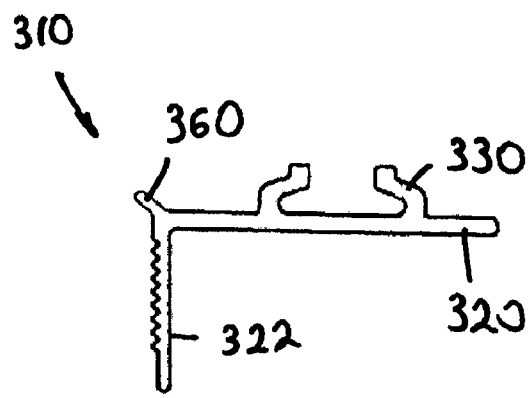
FIG. 9 is a side view of a rail adapter according to another embodiment of the invention.
Figure 10:
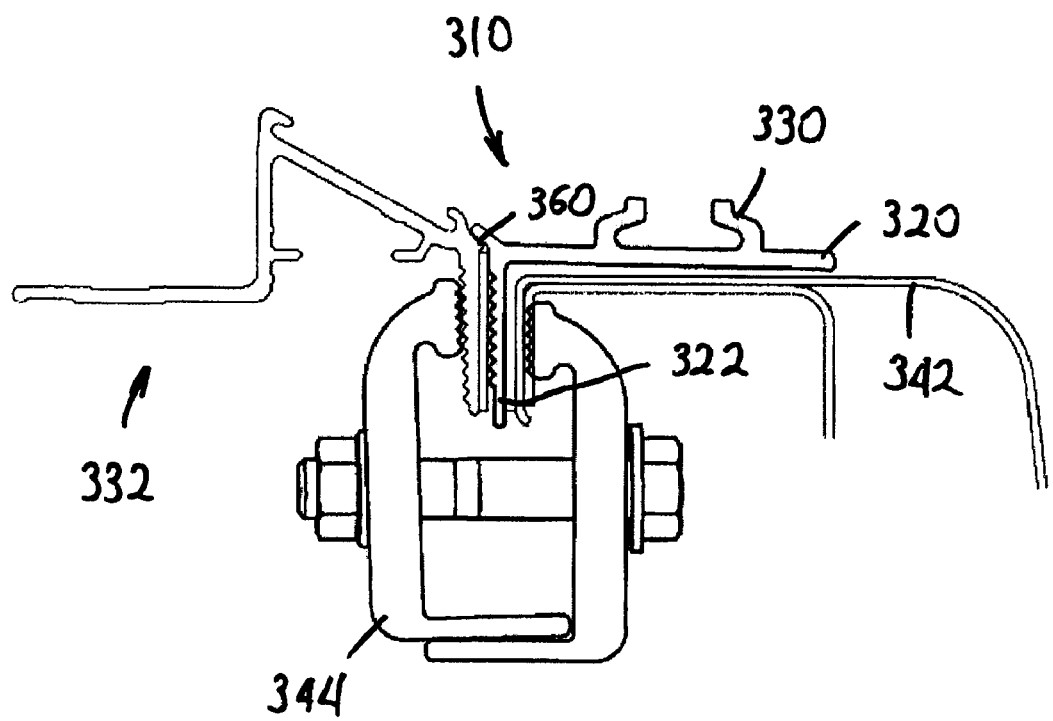
FIG. 10 is a side view of the rail adapter of FIG. 9 attached to a pickup bed with a tonneau cover side rail.

In another configuration, which is illustrated in FIGS. 9-10, an adapter rail 310 generally has a similar configuration to the adapter rail 110 illustrated in FIGS. 5-6. In particular, the adapter rail 310 includes a top rail 320, a side rail 322, a mounting track 330 and interlocking lip 360.

In contrast from the adapter rail 110 illustrated in FIGS. 5-6, the adapter rail 310 does not include an extension. Accordingly, the tonneau cover rail 332 would be held in position with respect to the adapter rail 310 with another mechanism when being attached to the pickup bed 342 with the clamp 344.

Figure 11:
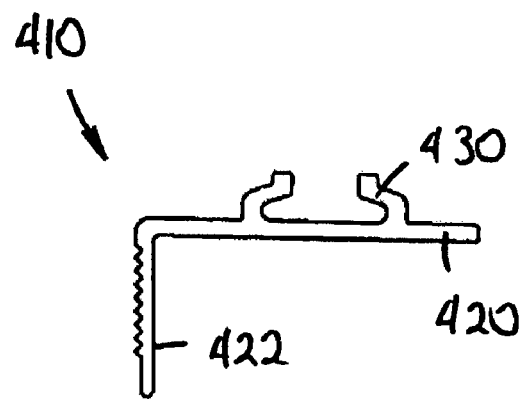
FIG. 11 is a side view of a rail adapter according to another embodiment of the invention.
Figure 12:
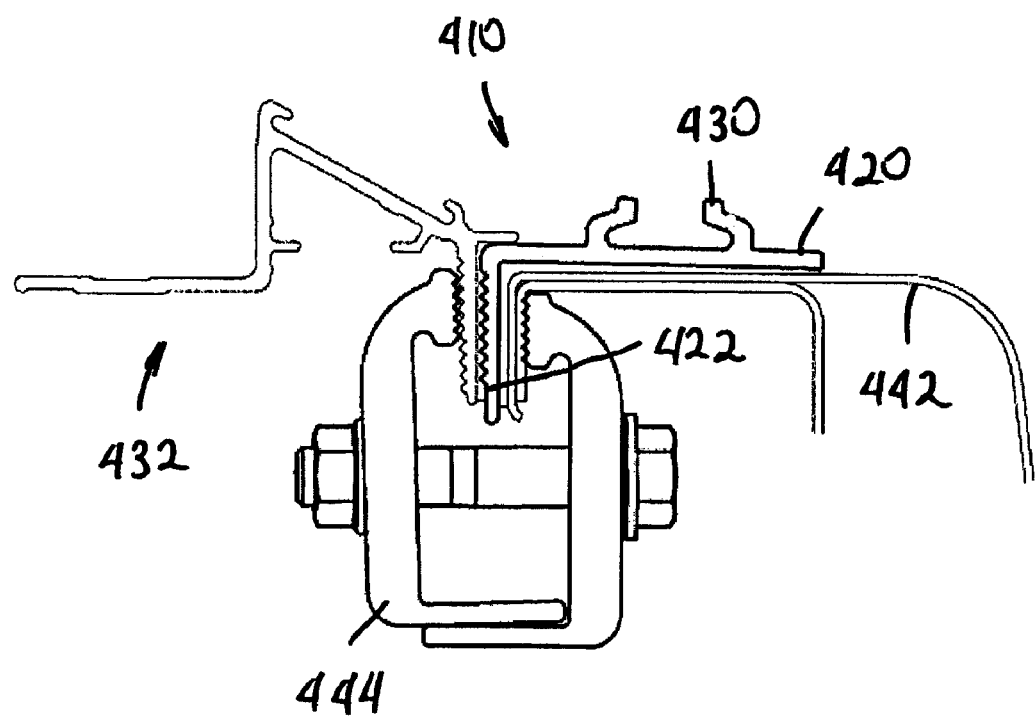
FIG. 12 is a side view of the rail adapter of FIG. 11 attached to a pickup bed with a tonneau cover side rail.

In another configuration, which is illustrated in FIGS. 11-12, an adapter rail 410 generally has a similar configuration to the adapter rail 10 illustrated in FIGS. 1-4. In particular, the adapter rail 410 includes a top rail 420, a side rail 422 and a mounting track 430.

In contrast from the adapter rail 10 illustrated in FIGS. 1-4, the adapter rail 410 does not include an extension. Accordingly, the tonneau cover rail 432 would be held in position with respect to the adapter rail 410 with another mechanism when being attached to the pickup bed 442 with the clamp 444.

Figure 13:
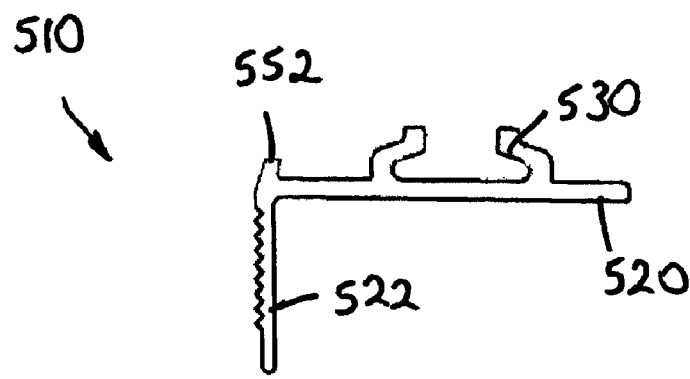
FIG. 13 is a side view of a rail adapter according to another embodiment of the invention.
Figure 14:
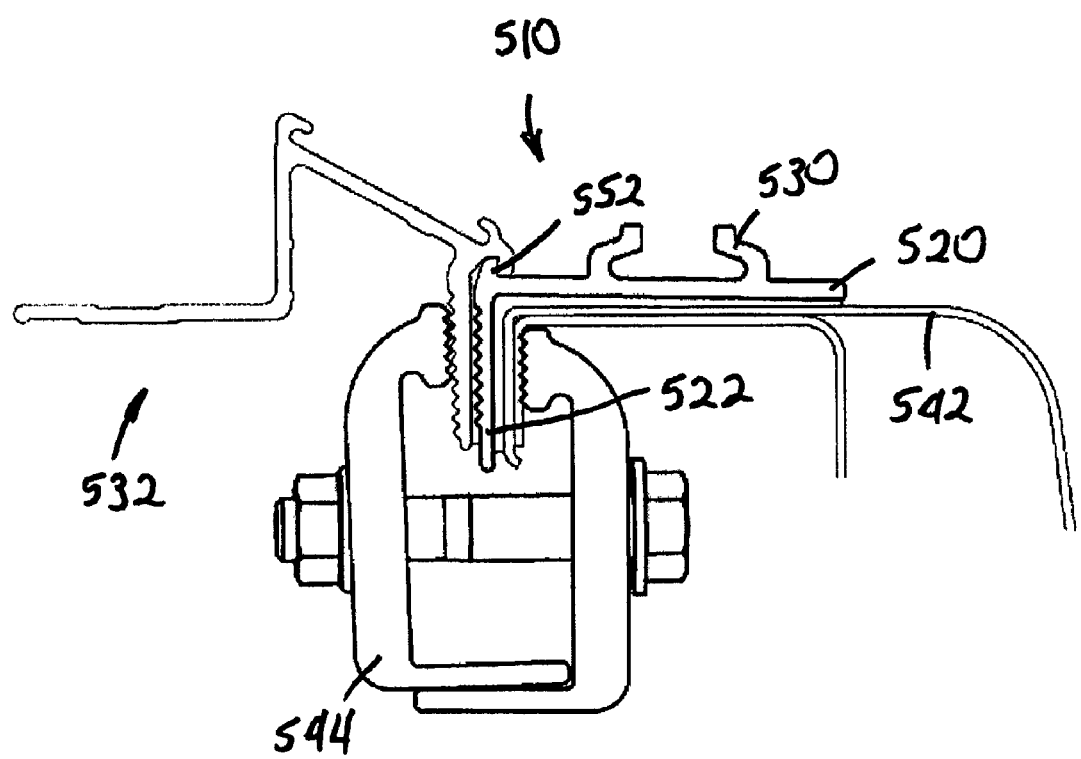
FIG. 14 is a side view of the rail adapter of FIG. 13 attached to a pickup bed with a tonneau cover side rail.

In another configuration, which is illustrated in FIGS. 13-14, an adapter rail 510 generally has a similar configuration to the adapter rail 410 illustrated in FIGS. 11-12. In particular, the adapter rail 510 includes a top rail 520, a side rail 522 and a mounting track 530.

In contrast from the adapter rail 410 illustrated in FIGS. 11-12, the adapter rail 510 includes a hook portion 552 extending therefrom proximate the intersection of the top rail 520 and the side rail 522. The hook portion 552 may be oriented at an angle of up to 90 degrees with respect to the top rail 520.

Forming the hook portion 552 with this configuration enables a portion of the tonneau cover rail 532 to extend over the hook portion 552 to retain the tonneau cover rail 532 in a stationary position with respect to the adapter rail 510 when the tonneau cover rail 532 and the adapter rail 510 are being attached to the pickup bed 542 with the clamp 544.

Figure 15:
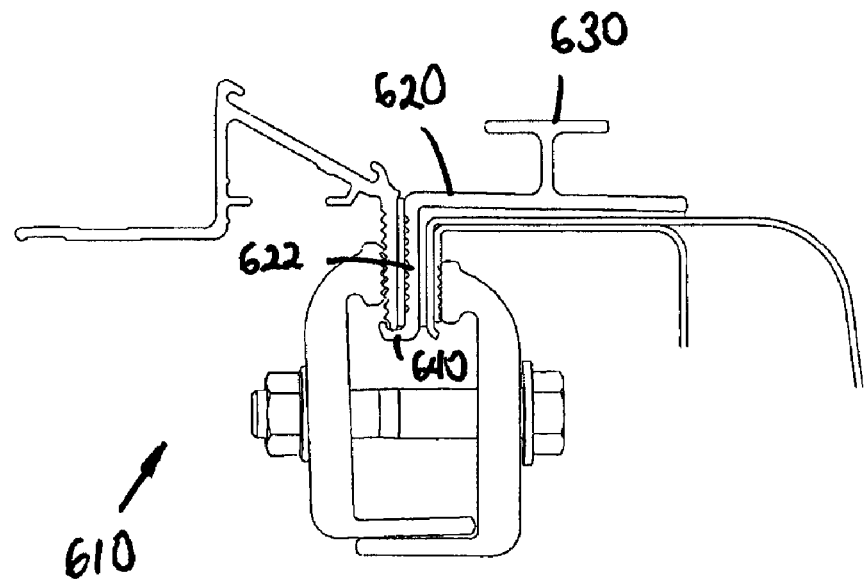
FIG. 15 is a side view of the rail adapter with an alternate mounting track attached to a pickup bed with a tonneau cover side rail.

In another configuration, which is illustrated in FIG. 15, an adapter rail 610 generally has a similar configuration to the adapter rail 10 illustrated in FIGS. 1-4. In particular, the adapter rail 610 includes a top rail 620, a side rail 622, a mounting track 630 and an extension 640. In this configuration, the mounting track 630 has a T-shaped configuration that is oriented horizontally.

Figure 16:
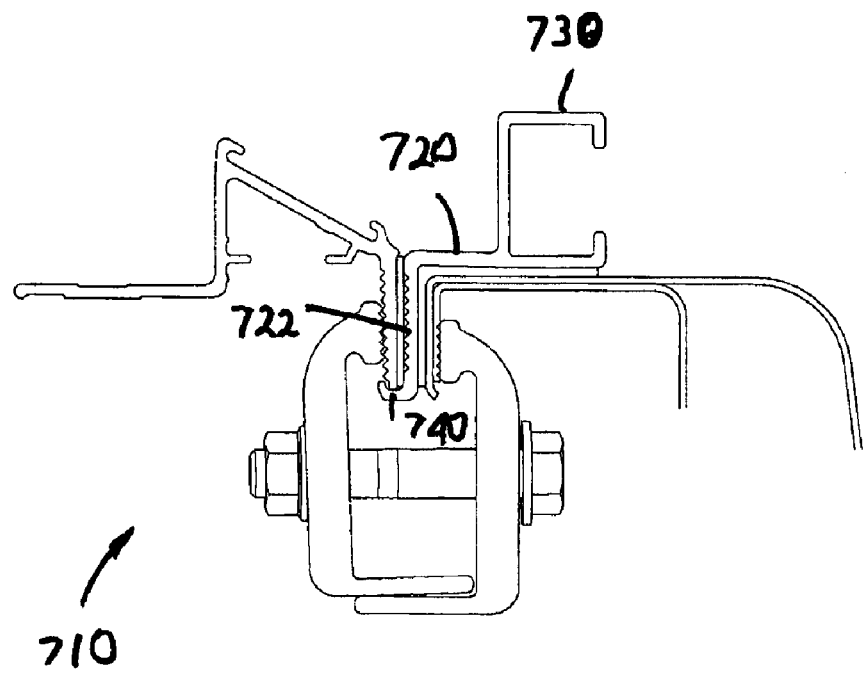
FIG. 16 is a side view of the rail adapter with an alternate mounting track attached to a pickup bed with a tonneau cover side rail.

In another configuration, which is illustrated in FIG. 16, an adapter rail 710 generally has a similar configuration to the adapter rail 10 illustrated in FIGS. 1-4. In particular, the adapter rail 710 includes a top rail 720, a side rail 722, a mounting track 730 and a extension 740. In this configuration, the mounting track 730 has a C-shaped configuration.

Figure 17:
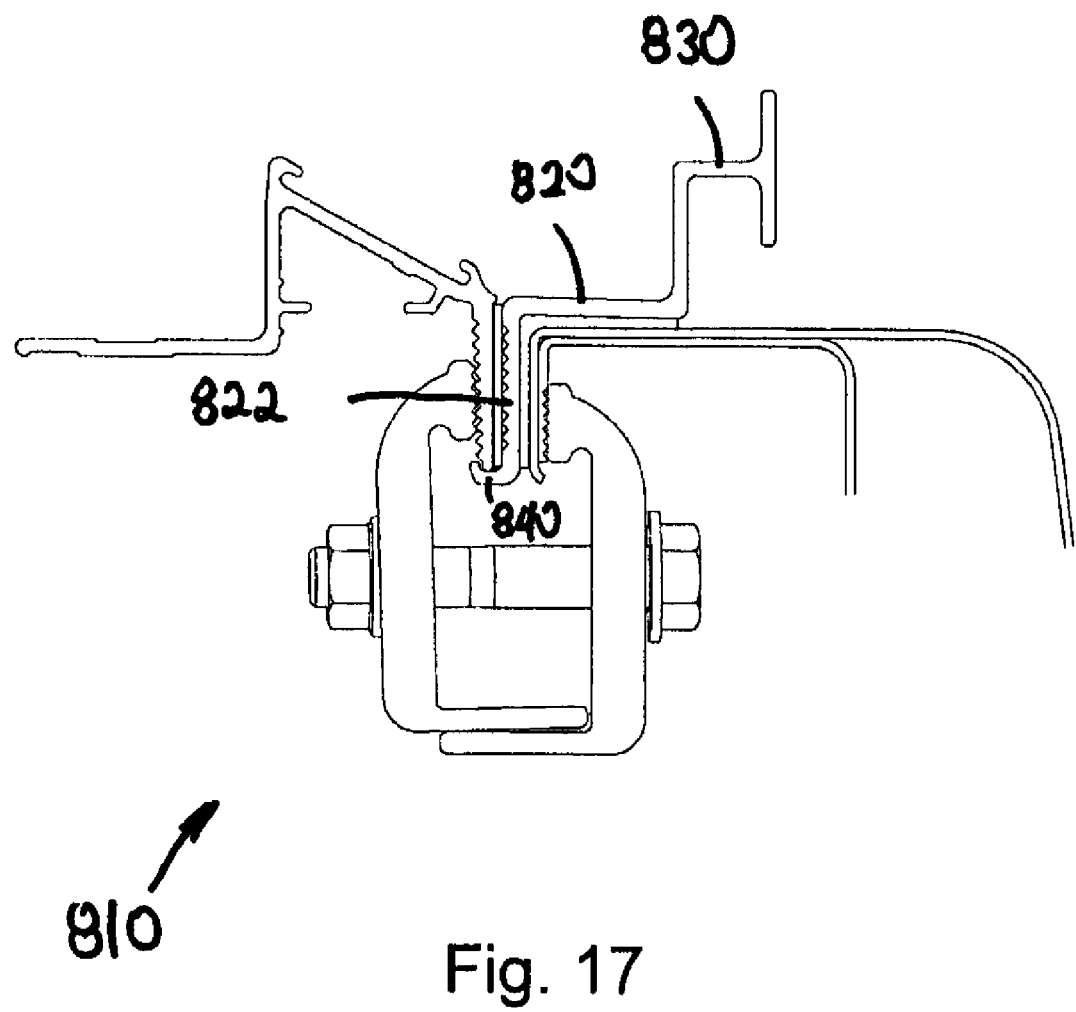
FIG. 17 is a side view of the rail adapter with an alternate mounting track attached to a pickup bed with a tonneau cover side rail.

In another configuration, which is illustrated in FIG. 17, an adapter rail 810 generally has a similar configuration to the adapter rail 10 illustrated in FIGS. 1-4. In particular, the adapter rail 810 includes a top rail 820, a side rail 822, mounting track 830 and an extension 840. In this configuration, the mounting track 830 has a T-shaped configuration that is oriented vertically.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. An adapter rail for attaching a rack and a tonneau cover rail to a side wall on a pickup bed, wherein the adapter rail comprises:
   a top rail;
   a side rail extending from the top rail;
   a mounting track attached to the top rail, wherein the mounting track is adapted to receive at least a portion of the rack for attaching the rack to the adapter rail; and
   an extension extending from the side rail, wherein the extension is adapted to support the tonneau cover rail in a stationary position with respect to the adapter rail.

2. The adapter rail of claim 1, wherein the top rail is oriented generally perpendicular to the side rail.

3. The adapter rail of claim 1, wherein the extension is attached to the side rail opposite the top rail.

4. The adapter rail of claim 1, wherein the extension is oriented substantially transverse to the side rail.

5. The adapter rail of claim 1, wherein the extension is J-shaped.

6. The adapter rail of claim 1, and further comprising an interlocking lip extending therefrom proximate an intersection of the top rail and the side rail.

7. The adapter rail of claim 1, and further comprising a hook portion extending therefrom proximate an intersection of the top rail and the side rail.

8. A truck rack mounting system comprising:
   an adapter rail comprising:
      a top rail;
      a side rail extending from the top rail;
      a mounting track attached to the top rail, wherein the mounting track is adapted to engage an adapter on the truck rack; and
      an extension extending from the side rail;
   a tonneau cover rail, wherein the extension supports the tonneau cover rail;
   a pickup bed side wall; and
   a clamp that retains the adapter rail and the tonneau cover rail in a stationary position with respect to the pickup bed side wall.

9. The truck rack mounting system of claim 8, wherein the top rail is oriented generally perpendicular to the side rail.

10. The truck rack mounting system of claim 8, wherein the extension is attached to the side rail opposite the top rail.

11. The truck rack mounting system of claim 8, wherein the extension is oriented substantially transverse to the side rail.

12. The truck rack mounting system of claim 8, wherein the extension is J-shaped.

13. The truck rack mounting system of claim 8, and further comprising an interlocking lip extending therefrom proximate an intersection of the top rail and the side rail.

14. The truck rack mounting system of claim 8, and further comprising a hook portion extending therefrom proximate an intersection of the top rail and the side rail.

15. A method of mounting a truck rack to a side wall on a pickup bed, the method comprising:
   providing an adapter rail comprising a top rail, a side rail extending from the top rail, a mounting track attached to the top rail and an extension extending from the side rail, wherein the mounting track is adapted to engage an adapter on the truck rack;
   positioning the adapter rail adjacent the side wall;
   positioning a portion of the tonneau cover rail adjacent the adapter rail;
   supporting the portion of the tonneau cover rail in a stationary position with respect to the adapter rail with the extension; and
   retaining the adapter rail and the tonneau cover rail in a stationary position with respect to the side wall with a clamp.

16. The method of claim 15, wherein the top rail is oriented generally perpendicular to the side rail.

17. The method of claim 15, wherein the extension is attached to the side rail opposite the top rail.

18. The method of claim 15, wherein the extension is oriented substantially transverse to the side rail.

19. The method of claim 15, wherein the extension is J-shaped.

20. The method of claim 15, and further comprising sealing a space between the adapter rail and the tonneau cover rail with an interlocking lip extending from the adapter rail proximate an intersection of the top rail and the side rail.

21. The method of claim 15, and further comprising supporting the tonneau cover rail in a stationary position with respect to the adapter rail with a hook portion extending from the adapter rail proximate an intersection of the top rail and the side rail.

* * * * *